United States Patent [19]

Takehara et al.

[11] Patent Number: 5,634,066
[45] Date of Patent: May 27, 1997

[54] INFORMATION PROCESSING APPARATUS

[75] Inventors: Mitsuru Takehara; Marc Bookman, both of Tokyo, Japan

[73] Assignee: Sony Corporation, Tokyo, Japan

[21] Appl. No.: 591,213

[22] Filed: Jan. 17, 1996

Related U.S. Application Data

[63] Continuation of Ser. No. 116,133, Sep. 2, 1993, abandoned.

[30] Foreign Application Priority Data

Sep. 14, 1992 [JP] Japan .................. 4-271004

[51] Int. Cl.⁶ .................. G06F 17/22
[52] U.S. Cl. .................. 395/797; 395/798
[58] Field of Search .................. 364/419.02, 419.05, 364/419.06, 419.07, 709.12, 709.14, 709.16, 419.16; 395/397, 798, 797, 145

[56] References Cited

U.S. PATENT DOCUMENTS

| | | | |
|---|---|---|---|
| 4,498,149 | 2/1985 | Yoshida | 364/900 |
| 4,593,356 | 6/1986 | Hashimoto et al. | 364/419.07 |
| 4,866,670 | 9/1989 | Adachi et al. | 364/419.05 |
| 5,109,355 | 4/1992 | Yuno | 364/709.12 |
| 5,136,504 | 8/1992 | Fushimoto | 364/419.02 |
| 5,255,355 | 10/1993 | Suziki | 395/145 |

FOREIGN PATENT DOCUMENTS

| | | | |
|---|---|---|---|
| 0369819A2 | 5/1990 | European Pat. Off. | G06F 15/02 |
| 2468942 | 10/1980 | France | G06F 3/02 |
| 2536608 | 5/1984 | France | H04B 7/00 |
| 356050464 | 5/1981 | Japan . | |
| 356072767 | 6/1981 | Japan . | |

OTHER PUBLICATIONS

Patent Abstracts of Japan, vol. 012, No. 161 (P–702), 17 May 1988 & JP-A-62 274 360 (NEC Corporation), 28 Nov. 1987.

Patent Abstracts of Japan, vol. 011, No. 313 (P–626), 13 Oct. 1987 & JP-A-62 105 265 (NEC Corporation), 15 May 1987.

*Primary Examiner*—Gail O. Hayes
*Assistant Examiner*—Frantzy Poinvil
*Attorney, Agent, or Firm*—Limbach & Limbach L.L.P.

[57] ABSTRACT

An information processing apparatus by which characters can be inputted easily. Characters of another language corresponding to an alphabetical character, for example, e of the English-USA language, such as, for example, characters e with an acute accent, e with a grave accent, e with a circumflex accent and e with an umlaut of the French language, are stored in a character table ROM. When a character key for the character e is manually operated, the alphabetical character e is displayed on a display unit. Then, each time a character conversion key is manually operated, the displayed character is successively converted into the characters corresponding to the character e.

12 Claims, 20 Drawing Sheets

| Language | Keyboard Entry | Character Key Transformation |
|---|---|---|
| UK | $ | £ |
| French | a | à , â |
| | c | ç |
| | C | Ç |
| | e | é , è , ê , ë |
| | i | î , ï |
| | o | ô , ó |
| | u | ù , û , ü , ú |
| German | a | ä |
| | A | Ä |
| | e | é |
| | o | ö |
| | O | Ö |
| | s | ß |
| | u | ü |
| | U | Ü |

FIG. 23

| Language | Keyboard Entry | Character Key Transformation |
|---|---|---|
| UK | $ | £ |
| French | a | à , â |
|  | c | ç |
|  | C | Ç |
|  | e | é , è , ê , ë |
|  | i | î , ï |
|  | o | ô , ó |
|  | u | ù , û , ü , ú |
| German | a | ä |
|  | A | Ä |
|  | e | é |
|  | o | ö |
|  | O | Ö |
|  | s | ß |
|  | u | ü |
|  | U | Ü |

FIG. 24

| Language | Keyboard Entry | Character Key Transformation |
|---|---|---|
| Spain | a | á |
| | A | Á |
| | c | ç |
| | C | Ç |
| | e | é |
| | E | É |
| | i | í |
| | I | Í |
| | n | ñ |
| | N | Ñ |
| | o | ó |
| | O | Ó |
| | u | ú, ü |
| | U | Ú, Ü |
| Italy | a | à |
| | e | è, é |
| | E | È |
| | i | ì |
| | o | ò |
| | u | ù |

FIG. 25

| Language | Keyboard Entry | Character Key Transformation |
|---|---|---|
| Scandanavian | a | å, æ ä, á |
| | A | Å, Æ, Ä, Á |
| | d | ð |
| | D | Ð |
| | e | é |
| | E | É |
| | i | í |
| | I | Í |
| | o | ö, ø, ó |
| | O | Ö, Ø, Ó |
| | t | þ |
| | T | Þ |
| | u | ú |
| | U | Ú |
| | y | ý, ÿ |
| | Y | Ý |

FIG. 26

| Language | Keyboard Entry | Character Key Transformation |
|---|---|---|
| Multi-language | a | à, â, ä, á, å, æ, ã |
| | A | À, Â, Ä, Á, Å, Æ, Ã |
| | c | ç |
| | C | Ç |
| | d | ð |
| | D | Ð |
| | e | é, è, ê, ë |
| | E | É, È, Ê, Ë |
| | i | í, î, ï, ì |
| | I | Í, Î, Ï, Ì |
| | n | ñ |
| | N | Ñ |
| | o | ô, ö, ó, ò, ø, õ |
| | O | Ô, Ö, Ó, Ò, Ø, Õ |
| | s | ß |
| | t | þ |
| | T | Þ |
| | u | ù, û, ü, ú |
| | U | Ù, Û, Ü, Ú |
| | y | ý, ÿ |
| | Y | Ý |
| | $ | £, ¥ |

FIG. 27(a)

Convension Cue
↓
ĕ é è ê ë

Subservice 00h : Select Language
- Input
  - AH    05h (Service number)
  - AL    00h (Subservice number)
  - Bx    Language number
- Output
  - Ax    =0 :exit normally
  -        =1 :Not supported language Language number
- 0 : USA (default)
- 1 : UK
- 2 : SPANISH
- 3 : FRENCH
- 4 : GERMAN
- 5 : ITALIAN
- 6 : SCANDINAVIA
- 7 : MULTI-LANGUAGE

INFORMATION PROCESSING APPARATUS

This application is a continuation of application Ser. No. 08/116,133 filed Sep. 2, 1993, now abandoned.

BACKGROUND OF THE INVENTION

1. Field of the Invention

This invention relation relates to an information processing apparatus having a character inputting function suitable for use with a reproducing apparatus which reproduces a CD-ROM (compact disk read only memory) of, for example, the XA format.

2. Description of the Related Art

Information processing apparatus such as personal computers and electronic notebook apparatus normally include a keyboard so that various characters can be inputted by manual operation of character keys on the keyboard. For example, in order to input alphabetical characters, character keys corresponding to 26 alphabetical characters from a to z are provided so that any desired alphabetical character can be inputted by manual operation of a corresponding one of the character keys.

By the way, also from the historical reason that information processing apparatus have been developed in the United States, such a keyboard is very frequently constructed as a keyboard for the English language. However, when it is tried to use the keyboard, for example, in a country in which the German language is used, since the German language includes several characters which are not included in the alphabetical characters of the English language, character keys for inputting such characters are required.

Conventionally, one of the following two methods is adopted in order to input the special characters.

According to the first method, the allocation of character keys is modified. In particular, the corresponding relationship between characters and character keys is modified, for example, such that a character other than the alphabetical character a is allocated to a character key on which the alphabetical character a is indicated.

On the other hand, according to the second method, a special key is prepared for a special character so that, when a character key is inputted immediately after the special key has been manually operated, a character different from that which is inputted when the character key is manually operated by itself is inputted.

With the first method, however, since the allocation of the keys is modified, it sometimes occurs that the operator forgets which one of the keys should be operated in order to input a desired character.

Meanwhile, with the second method, another key must be manually operated before a character key is manually operated, and the operator must know in advance which character can be inputted by manual operation of a certain key.

Further, in either case, the keyboard must be put into a specific inputting condition before a character key is inputted. Accordingly, the psychological burden to the user is heavy.

SUMMARY OF THE INVENTION

It is an object of the present invention to provide an information processing apparatus which is improved in operability in that characters can be inputted readily.

In order to attain the object described above, according to an aspect of the present invention, there is provided an information processing apparatus, which comprises a plurality of manually operable character keys for inputting a set of characters of a language of a particular country, a manually operable conversion key for converting a character inputted by manual operation of one of the character keys into a corresponding character defined in another language of a second country, a table for storing characters of the language of the second country corresponding to the characters of the language of the particular country, display means for displaying characters, and controlling means for causing the display means to display a character of the language of the particular country in response to manual operation of one of the character keys and referring, when the conversion key is manually operated subsequently, to the table to convert the character displayed on the display means into a corresponding character of the language of the second country so as to be displayed on the display means.

In the information processing apparatus, if one of the character keys is manually operated first to input an alphabetical character and then the conversion key is manually operated, then the alphabetical character displayed on the display means by the inputting operation is converted into a corresponding character of the language of the second country so as to be displayed on the display means. Consequently, the necessity of manually operating a special key before inputting a character is eliminated, and the psychological burden to the operator is moderated. Further, since the characters of the language of the second country are stored in the storage means in a corresponding relationship to the alphabetical characters, selection of a character is easy. Accordingly, the information processing apparatus is improved in operability and facilitated in inputting of characters.

The characters of the language of the particular country may be the alphabetical characters while the language of the second country is a Latin language other than the English language, and characters used in the Latin language may be stored in the table corresponding to the alphabetical characters used in the English language. Characters used in the Latin language and characters associated with the characters may be stored in the table corresponding to the alphabetical characters. The controlling means may refer, each time the conversion key is manually operated after the controlling means causes the display means to display a character of the language of the particular country in response to manual operation of one of the character keys, to the table to successively convert the character displayed on the display means into a corresponding character of the language of the second country so as to be displayed on the display means. Alternatively, the controlling means may refer, each time the conversion key is manually operated, to the table to successively convert the character displayed on the display means into a successive one of corresponding characters of the language of the second country so as to be displayed on the display means, and when the conversion key is manually operated after the displayed character is converted into the last one of the associated characters, a similar sequence of conversion and displaying operations may be repeated.

Characters of the language of the second country corresponding to the characters of the language of the particular country and characters associated with the characters may be stored in the table. The table may store characters of the language of the second country corresponding to the characters of the language of the particular country and characters with the characters for a language of each of a plurality of countries. Or, characters of languages of a plurality of countries corresponding to the characters of the language of the particular country and characters associated with the characters may be stored as a multi-language including the plurality of languages in the table.

According to another aspect of the present invention, there is provided an information processing apparatus, which comprises a manually operable symbol key for inputting a currency unit symbol of a particular country, a manually operable conversion key for converting the currency unit symbol inputted by manual operation of the symbol key into another corresponding currency unit symbol of a second country, a table for storing the currency unit symbol of the second country corresponding to the currency unit symbol of the particular country, display means for displaying a currency unit symbol, and controlling means for causing the display means to display the currency unit symbol of the particular country in response to manual operation of the symbol key and referring, when the conversion key is manually operated, to the table to convert the currency unit symbol displayed on the display means into the corresponding currency unit symbol of the second country so as to be displayed on the display means.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 23 to 26 are tables illustrating stored contents of a character table ROM shown in FIG. 9;

FIGS. 27(a) and 27(b) are diagrammatic views illustrating a change of an array of characters by learning; and FIG. 28 is a program list illustrating selection one of languages of the character table ROM of FIG. 9 in execution of an application program.

DESCRIPTION OF THE PREFERRED EMBODIMENT

Referring first to FIGS. 1 to 4, there is shown a CD-ROM reproducing apparatus to which an information processing apparatus having a character inputting function according to the present invention is applied. The reproducing apparatus shown includes, as basic components, a housing 1, and an inner lid 2 and an outer lid 3 mounted for individual pivotal motion on the housing 1. The housing 1 and the inner and outer lids 2 and 3 are all formed from a synthetic resin. The reproducing apparatus has a size of, as seen from FIG. 1, about 180 mm wide, about 48 mm thick and about 147 mm deep so that it can be carried similarly to a computer of the notebook type.

Figure 1:
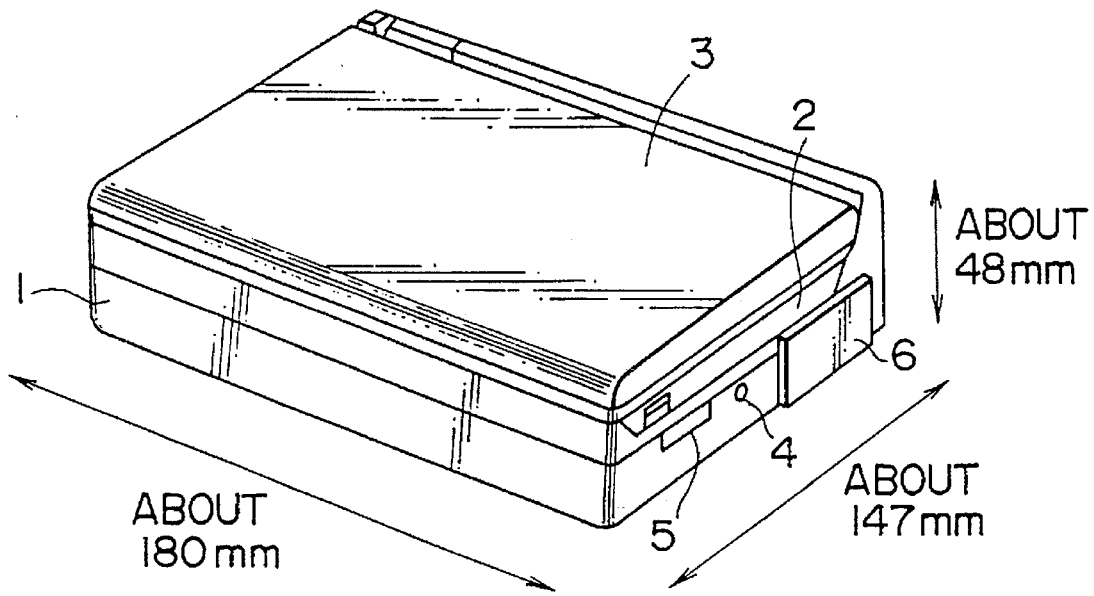
FIG. 1 is a perspective view of a CD-ROM reproducing apparatus to which an information processing apparatus of the present invention is applied showing a preferred embodiment of the present invention.
Figure 2:
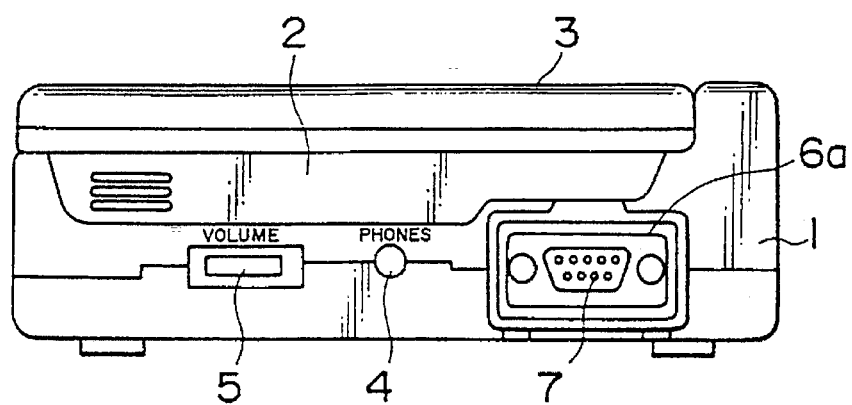
FIG. 2 is a right-hand side elevational view of the CD-ROM reproducing apparatus of FIG. 1.

Referring particularly to FIGS. 1 and 2, a jack 4 for connection to a headphone (not shown) and a volume button 5 are provided on a right-hand side face of the housing 1. The volume button 5 is used to adjust the level of an audio signal to be outputted to the headphone or a loudspeaker 37 (which will be hereinafter described with reference to FIG. 6) built in the housing 1. Also a plug 7 for connection to an RS232C cable is provided on the right-hand side face of the housing 1 so as to allow communication of data with an external apparatus. When no RS232C cable is connected to the plug 7, a hole 6a in which the plug 7 is provided is closed with a cap 6 made of rubber so that dust or some other foreign article may not be admitted into the hole 6a.

Figure 3:
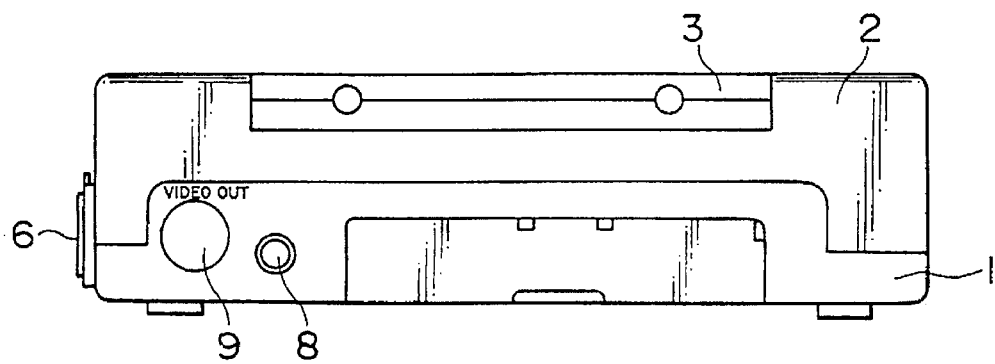
FIG. 3 is a rear elevational view of the CD-ROM reproducing apparatus of FIG. 1.

Referring now to FIG. 3, a jack 8 is provided on a rear face of the housing 1 so that dc power may be supplied to various circuits (which will be hereinafter described in detail with reference to FIG. 9) accommodated in the inside of the housing 1. A video output terminal 9 is provided alongside the jack 8 so that a video signal reproduced from a CD-ROM 66 (which will be hereinafter described with reference to FIG. 7) loaded in position in the housing 1 may be outputted to an external apparatus.

Figure 4:
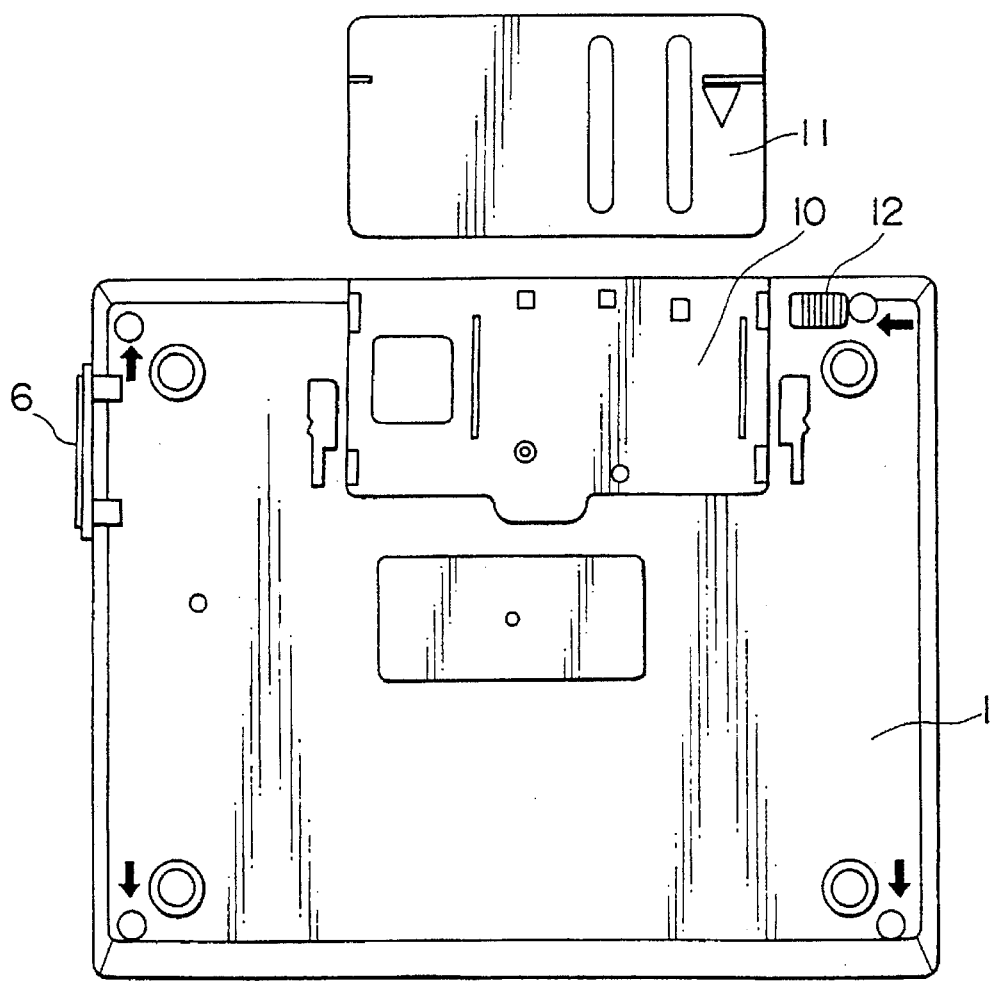
FIG. 4 is a bottom plan view of the CD-ROM reproducing apparatus of FIG. 1.

Referring to FIG. 4, a hole 10 for accommodating a battery 11 therein is formed on the bottom of the housing 1. The hole 10 is closed with the battery 11 when the battery 11 is accommodated therein. The battery 11 is locked when it is accommodated into the hole 10, and when a slide button 12 is slidably moved in the leftward direction in FIG. 4, the battery 11 is unlocked so that it can be removed from the hole 10.

Figure 5:
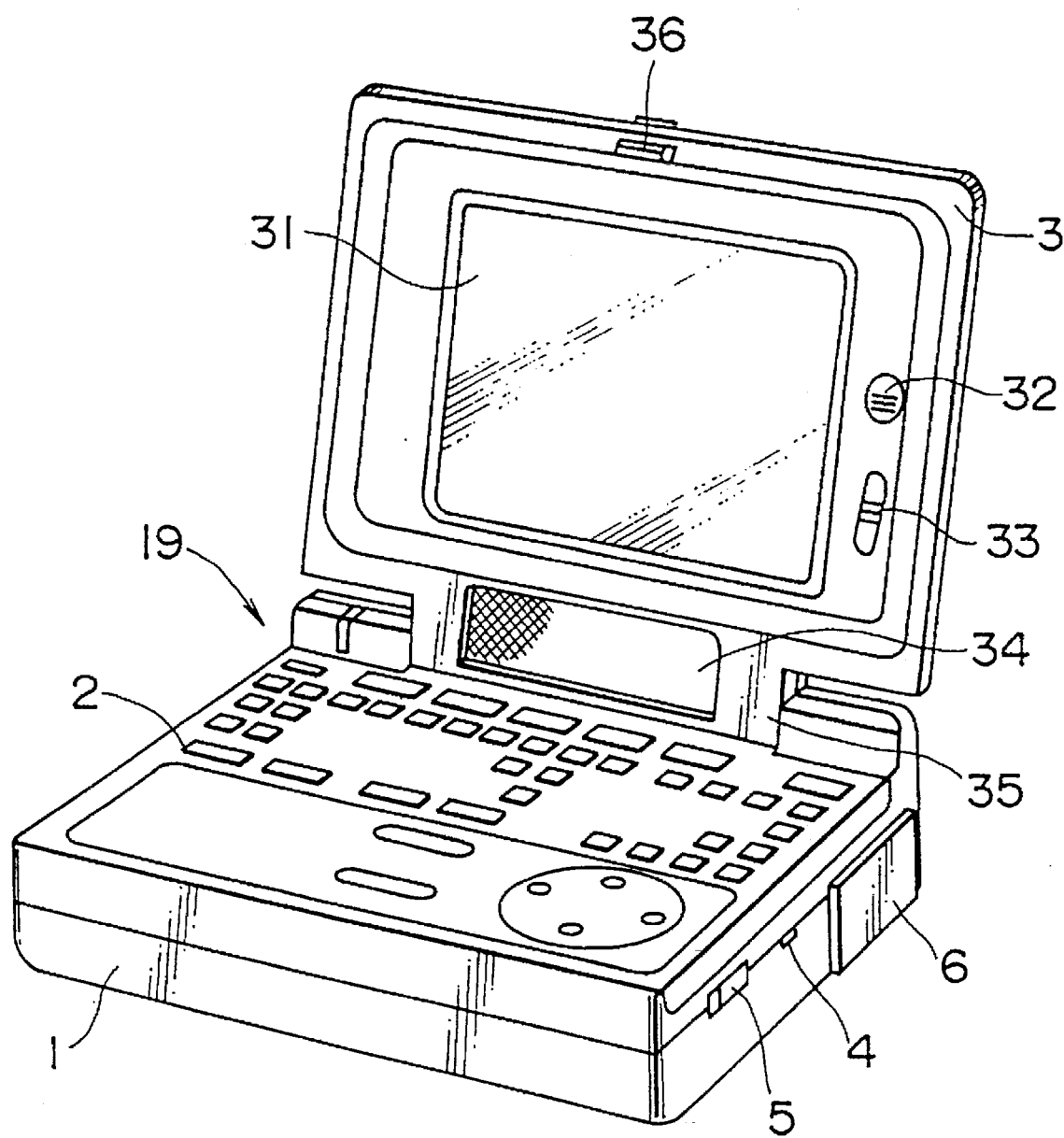
FIG. 5 is a perspective view of the CD-ROM reproducing apparatus of FIG. 1 with an outer lid opened.
Figure 6:
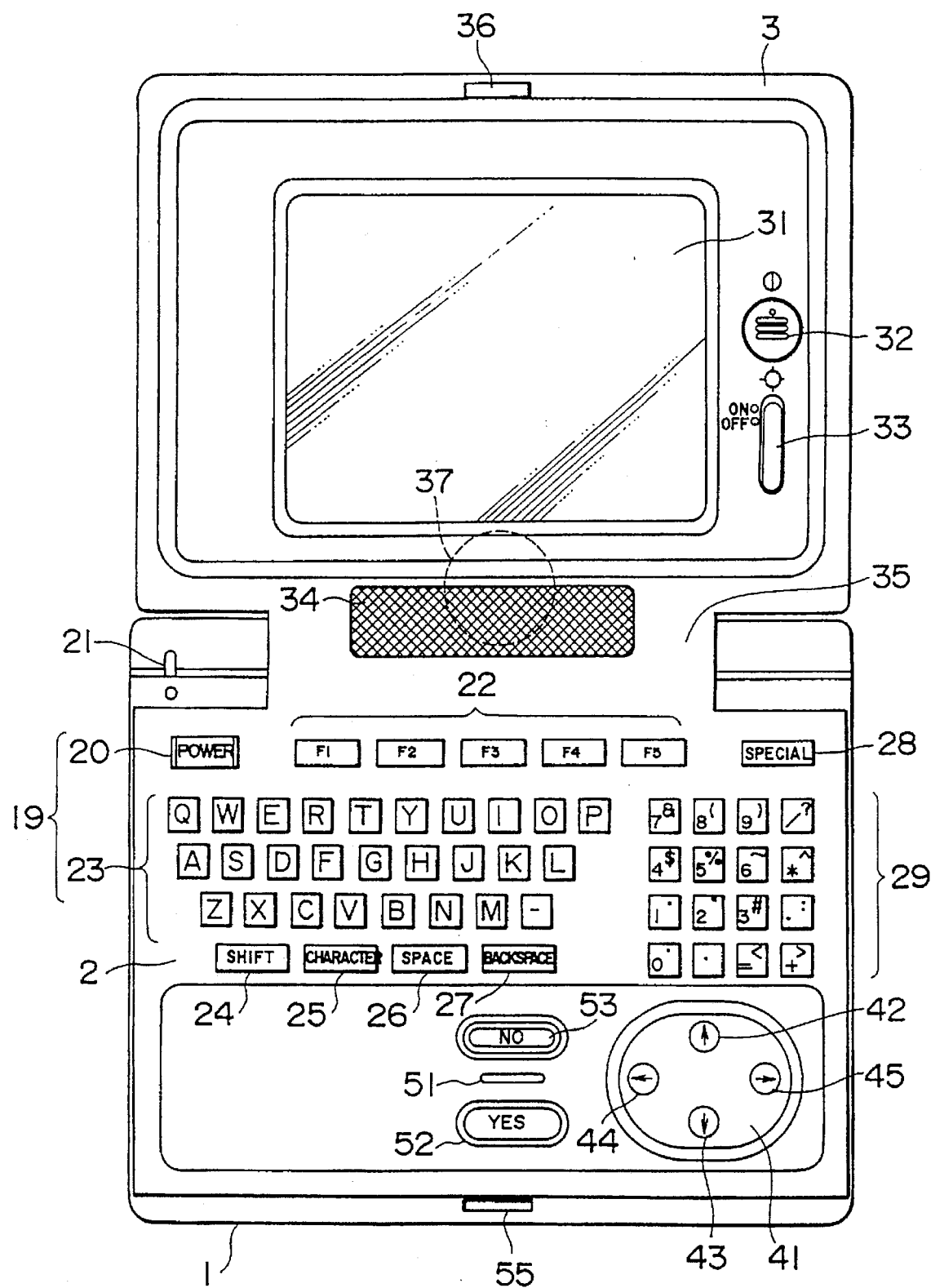
FIG. 6 is a top plan view of the CD-ROM reproducing apparatus of FIG. 1 with the outer lid opened to 180 degrees.

FIGS. 5 and 6 show an appearance of the CD-ROM reproducing apparatus when the outer lid 3 is open with respect to the housing 1. When the outer lid 3 is pivoted relative to the housing 1 as shown in FIG. 5, the inner lid 2 is exposed outside. A keyboard having various operation buttons 19 thereon is formed on an upper face of the inner lid 2. The operation buttons 19 are shown in detail in FIG. 6. A power source switch 20 is provided at a left upper corner portion in FIG. 6 of the inner lid 2 and is manually operated when power is to be made available or cut. When the power source switch 20 is manually operated to make power available, a power source lamp 21 provided at a left upper corner portion in FIG. 6 of the upper face of the housing 1 is lit. The power source lamp 21 is extinguished when power is cut. On the other hand, when the voltage of the battery 11 becomes lower than a predetermined reference level while dc power is not supplied by way of the jack 8 and the CD-ROM reproducing apparatus is operating with the battery 11, the power source lamp 21 flickers. The power source lamp 21 is disposed so that its lit condition can be visually observed when the outer lid 3 is in any of its open condition and closed condition.

Five function keys (F1 to F5) 22 are provided on the right-hand side of the power source button 20, and when any one of the function keys 22 is manually operated, an operation allocated to it is executed. Character keys 23 for inputting alphabetical characters are disposed on the left-hand side of a middle portion of the inner lid 2. A shift (SHIFT) key 24, a character conversion (CHARACTER) key 25, a space (SPACE) key 26 and a backspace (BACKSPACE) key 27 are provided on the lower side in FIG. 6 of the character keys 23. The shift key 24 is manually operated simultaneously with one of the character keys 23, when, for example, an alphabetical character of a capital letter is to be inputted. The space key 26 is manually operated when a space is to be inserted. The backspace key 27 is manually operated when a character displayed on the left-hand side of a cursor on a display section 31 which will be hereinafter described is to be deleted. The character conversion key 25 is manually operated, when, for example, a character having an umlaut mark as in the German language is to be inputted, subsequently to manual operation of a character key 23 of the character.

Ten keys 29 are provided on the right-hand side in FIG. 6 of the character keys 23 and selectively operated manually when a numeral is to be inputted. A special (SPECIAL) key 28 is provided on the upper side in FIG. 6 of the ten keys 29. The special key 28 is manually operated when a changing program is to be rendered operative so as to selectively change the input mode to any one of an English input mode, a German input mode and a French input mode or to selectively change the time at which power is to be automatically cut.

An operation plate 41 is provided on the lower side in FIG. 6 of the ten keys 29, and arrow marks 42 to 45 are displayed at upper, lower, left and right portions of the operation plate 41. When the operation plate 41 is depressed at any of the displayed portions of the arrow marks 42 to 45, the displayed position of the cursor is moved upwardly, downwardly, leftwardly or rightwardly accordingly. A substantially linear rib 51 is formed on the left-hand side in FIG. 6 of the operation plate 41, and a NO key 53 and a YES key 52 are provided on the upper and lower sides, in FIG. 6, of the rib 51, respectively. For example, with the fore finger, the thumb and the middle finger placed at the rib 51, the YES key 52 and the NO key 53, respectively, the keys 52 and 53 can be operated with certainty without looking at the keys. Further, in order to allow the YES key 52 and the NO key 53 to be identified from each other only by touching with the keys with fingers, the YES key 52 has a surface formed in a convex profile while the NO key 53 has a surface formed in a concave profile.

The YES key 52 or the NO key 53 is manually operated when a positive response or a negative response is to be inputted. The YES key 52 and the NO key 53 correspond to an enter key and an escape key (not shown) of common personal computers and have the same key codes (0DH and 1BH) as those of the enter key and the escape key allocated thereto.

A display section 31 is formed substantially at a middle location of an inner face of the outer lid 3 and includes an LCD (liquid crystal display) 100 (refer to FIG. 9) of 320× 200 dots. The display section 31 displays thereon an image reproduced from a CD-ROM 66 or characters, numerals and some other symbols inputted by way of manual operation of the character keys 23 and/or the ten keys 29. A knob 32 is provided on the right-hand side in FIG. 6 of the display section 31 and is manually turned in the clockwise direction or the counterclockwise direction when the contrast of the display section 31 is to be adjusted. A slide button 33 is provided on the lower side in FIG. 6 of the knob 32 and is slidably moved upwardly or downwardly in FIG. 6 when a backlight (not shown) disposed in the inside of the display section 31 (on the rear side of the LCD 100) is to be turned on or off.

The outer lid 3 is coupled at a coupling portion 35 thereof below the display section 31 to the housing 1, and a sound discharging section 34 is provided on a face of the coupling portion 35 of the outer lid 3 which opposes the housing t, that is, the inner lid 2. A loudspeaker 37 is disposed in the inside of the sound discharging section 37. Since the loudspeaker 37 (sound discharging section 34) is disposed in a same plane as the display section 31, it is directed in the same direction as the display section 31. Accordingly, compared with an alternative arrangement wherein the loudspeaker 37 is disposed, for example, on a side face of the outer lid 3, the user, which uses the CD-ROM reproducing apparatus while observing the display section 31, can identify sound outputted from the loudspeaker 37 more easily.

A hook 36 is formed at an end (upper side in FIG. 6) of the inner face of the outer lid 3 so that, when the outer lid 3 is closed, it is locked at the hook 36 thereof by a locking portion 55 of the housing 1.

Figure 7:
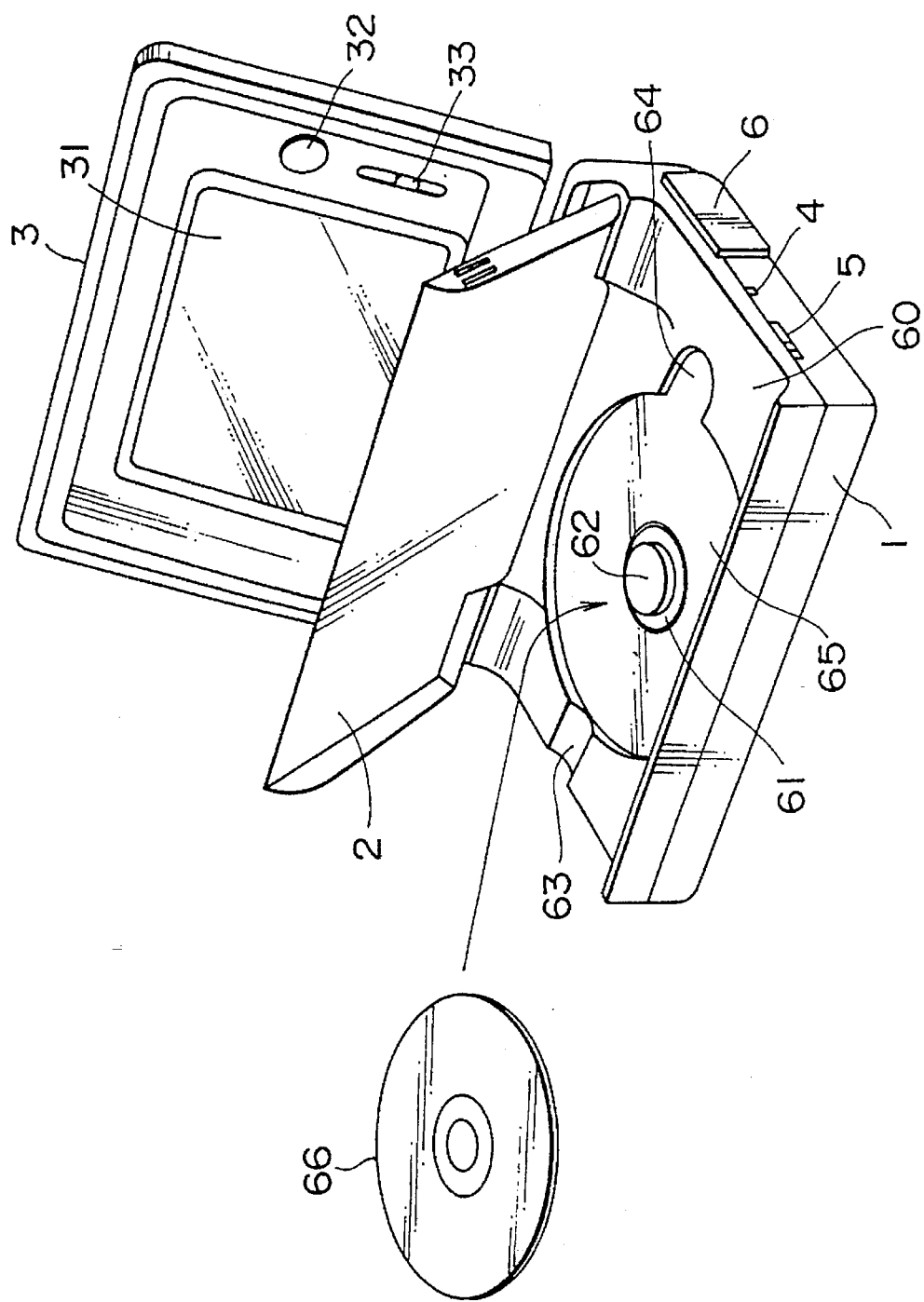
FIG. 7 is a perspective view of the CD-ROM reproducing apparatus of FIG. 1 with the outer lid and an inner lid opened.
Figure 8:
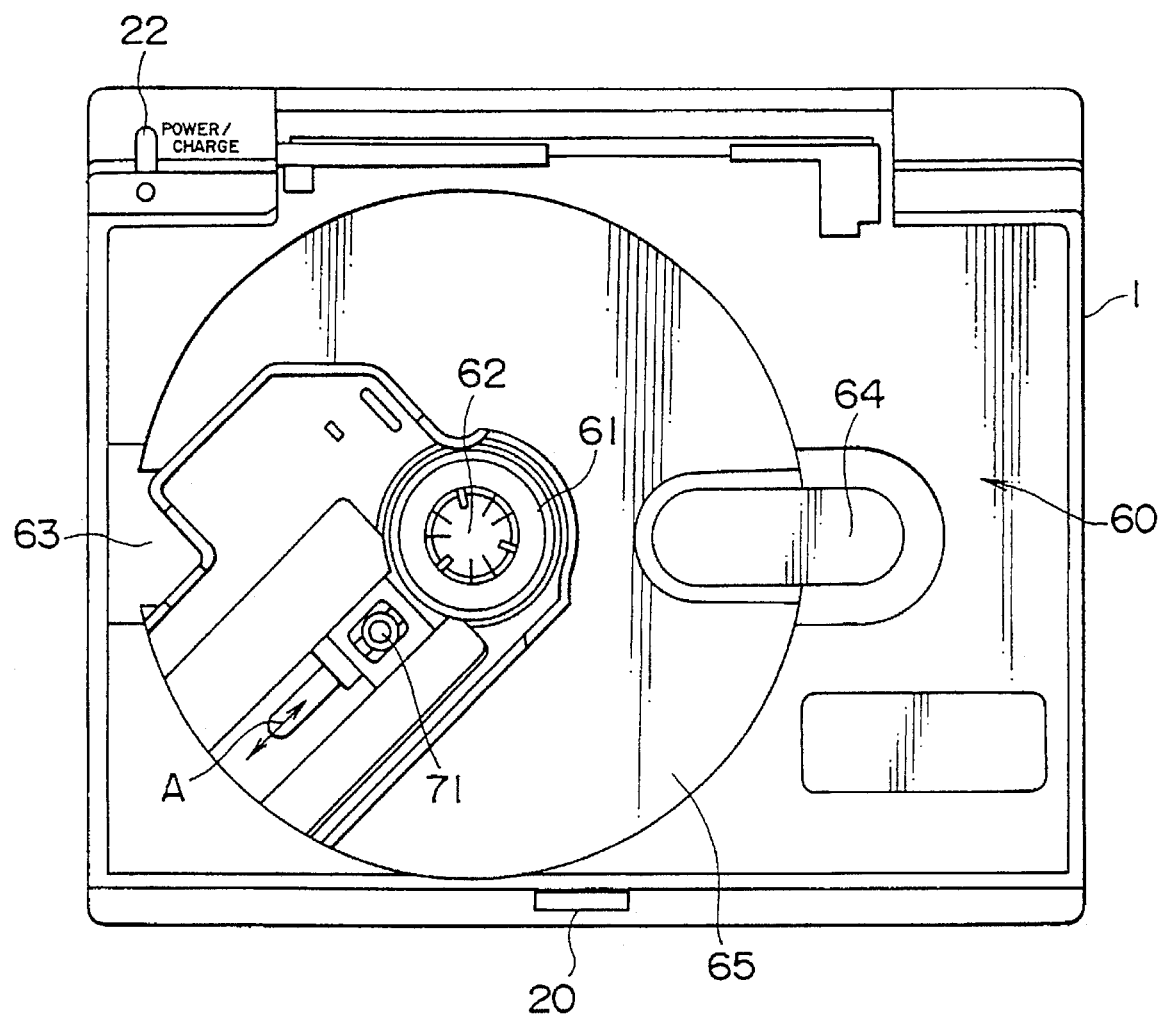
FIG. 8 is a top plan view of the CD-ROM reproducing apparatus of FIG. 1 with the outer lid and the inner lid removed.

FIGS. 7 and 8 show the CD-ROM reproducing apparatus in a condition wherein the inner lid 2 is open. More particularly, FIG. 7 shows the apparatus in a condition wherein the inner lid 2 is open while FIG. 8 shows the apparatus in another condition wherein the outer lid 3 and the inner 2 are removed from the housing 1.

When the outer lid 3 is pivoted relative to the housing 1 to an open position and then the inner lid 3 is pivoted relative to the housing 1 to an open position as shown in FIG. 7, a loading section 60 for a CD-ROM 66 formed at an upper portion of the housing 1 is exposed to the outside. A turntable 61 is disposed at the center of the loading section 60, and a chucking member 62 is formed at the center of the turntable 61. When a CD-ROM 61 is to be reproduced, it will be placed onto the turntable 61, and thereupon, the CD-ROM 61 is fixed to the turntable 61 by the chucking member 62. Consequently, even if the turntable 61 is rotated at a high speed, the CD-ROM 66 is prevented from being let off the turntable 61. A recess 65 having a size substantially equal to that of the CD-ROM 66 is formed around an outer periphery of the turntable 61 so that the CD-ROM 66 may rotate without contacting with the housing 1. A pair of recesses 63 and 64 are formed contiguously to the recess 65 and extend radially outwardly. An operation of placing or removing a CD-ROM 66 onto or from the turntable 61 can be performed readily by putting the fingers into the recesses 63 and 64.

Referring particularly to FIG. 8, an optical pickup 71 is disposed for movement in the directions indicated by a double-sided arrow mark A, that is, in radial directions of the CD-ROM 66 in the inside of the housing 1. A thread motor (not shown) for feeding the optical pickup 71 in radial directions of the CD-ROM is accommodated in the inside of the housing 1. The optical pickup 71 has a focusing actuator and a tracking actuator not shown so that servoing may be applied in the focusing direction and the tracking direction, respectively.

Figure 9:
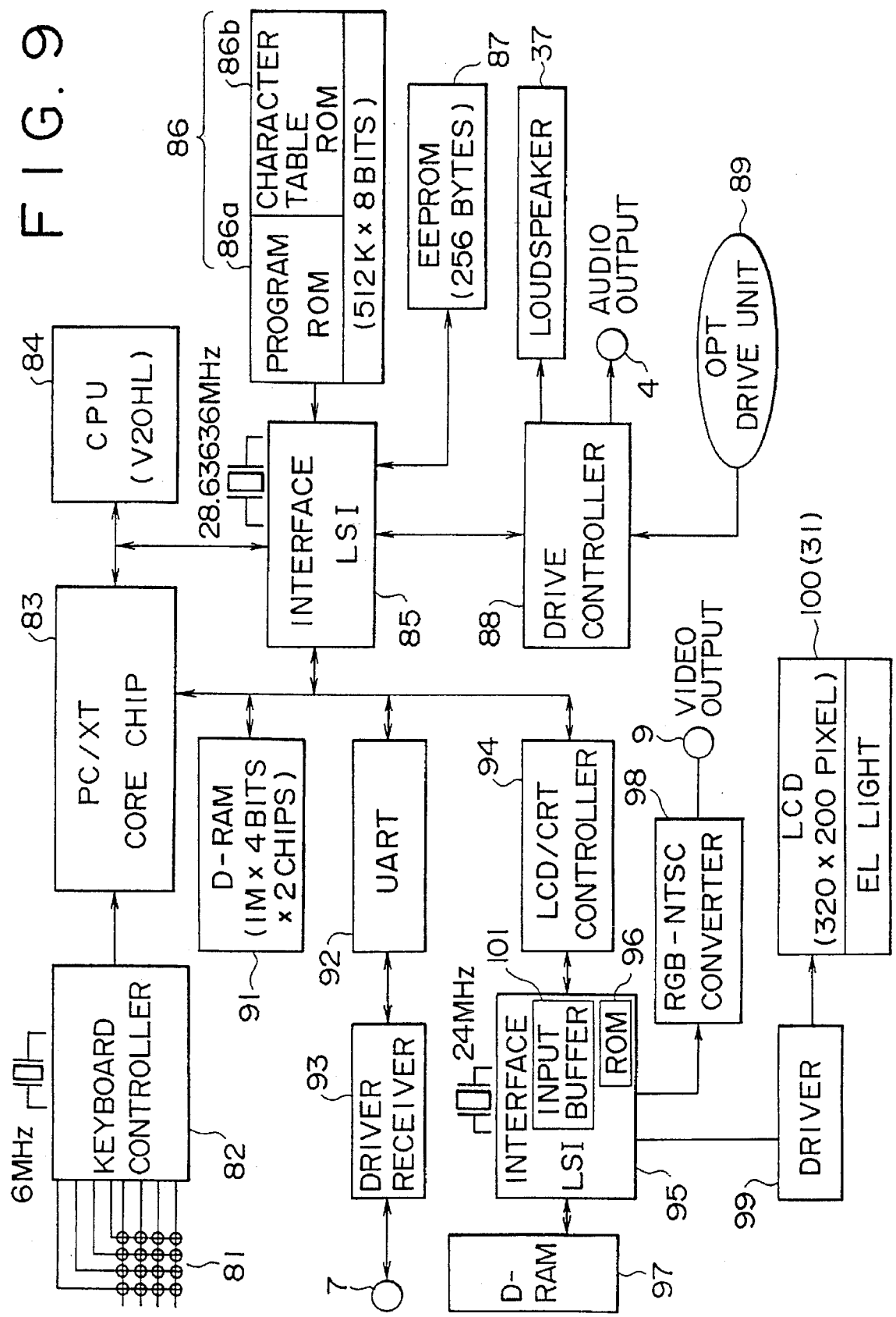
FIG. 9 is a block diagram showing an electric construction of the CD-ROM reproducing apparatus of FIG. 1.

FIG. 9 shows a construction of electric circuitry installed in the housing 1. Referring to FIG. 9, a key matrix 81 detects operation of any of the operation buttons 19 on the inner lid 2 and outputs a corresponding detection signal to a keyboard controller 82 constituted from a one-chip microcomputer.

The keyboard controller 82 operates with a clock signal of 6 MHz and outputs a signal corresponding to operation of an operation button 19 to a core chip 83. The core chip 83 executes processing for making a program or data supplied thereto from a CD-ROM 66 compatible with the personal computer PC/XT (trademark of IBM) by IBM. The core chip 83 is connected to a main CPU (V20HL (trademark of NEC) by NEC) 84 for controlling various components of the CD-ROM reproducing apparatus. The CPU 84 operates with a clock signal of 9.54545 MHz and is connected to a ROM 86, an EEPROM 87 and a drive controller 88 by way of an interface LSI 85 which operates with a clock signal of 28.63636 MHz.

The ROM 86 includes a program ROM 86a and a character table ROM 86b. The program ROM 86a stores in advance therein several programs necessary for operation of the CPU 84. The programs include, in addition to system programs, a changing program which is executed when the special key 28 is operated, and programs for assuring the compatibility of programs and data between reproducing apparatus (programs) of different versions. The character table 86b stores therein tables of characters corresponding to alphabetical characters (English language) of several languages such as the German language and the French language.

The EEPROM 87 temporarily stores therein data which must necessarily be held even after the power supply is cut. The drive controller 88 is connected to a pickup drive unit 89 and demodulates reproduction data from the CD-ROM 66 supplied thereto from the pickup drive unit 89, outputs an audio signal from among the reproduction data to the loudspeaker 37 and the jack 4 (FIG. 2) and outputs video data from among the reproduction data to the interface LSI 85.

The interface LSI 85 is connected also to the core chip 83, a D-RAM 91 serving as a main memory, a UART (universal asynchronous receiver/transmitter) 92 and an LCD/CRT controller 94 by way of a bus so that data may be communicated to and from them. The D-RAM 91 stores therein, when necessary, data supplied thereto from the core chip 83, the interface LSI 85, the UART 92, the LCD/CRT controller 94 or the like. The UART 92 executes processing necessary for production of data conforming to the RS232C standards and outputs a result of the processing to a driver receiver 93. An output of the driver receiver 93 is outputted to the plug 7 (FIG. 2). On the other hand, RS232C data inputted by way of the plug 7 is converted into a voltage by the driver receiver 93 and inputted to the UART 92. The UART 92 converts the input data into data which can be processed by the CPU 84.

The LCD/CRT controller 94 controls operations regarding a display. In particular, the LCD/CRT controller 94 writes a video signal to be outputted to the LCD 100 or the video output terminal 9 into a D-RAM 97 by way of an interface LSI 95. The D-RAM 97 ia a video RAM in which bit map data corresponding to the display screen are developed. The interface LSI 95 has a ROM 96 which stores in advance therein a table which is used to change the gray scale of a display image. Further, the interface LSI 95 has an input buffer 101 for storing therein data corresponding to characters to be displayed on the LCD 100. A converter 98 converts digital RGB data for a computer outputted from the interface LSI 95 into an analog video signal of the NTSC system and outputs the analog video signal to the video output terminal 9. A driver 99 supplies monochrome video data outputted from the interface LSI 95 to the LCD 100 so as to be displayed on the LCD 100. The driver 99 also executes control of the contrast of the LCD 100 and on/off control of the backlight (EL light) for the LCD 100 in response to operation of the knob 32 or the slide button 33 (FIGS. 5 and 6). The LCD 100 is provided in the display section 31 together with the backlight.

In operation, when one of the operation buttons 19 (FIG. 6) is manually operated, the key thus operated is detected by the key matrix 82, and a corresponding detection signal is inputted to the CPU 84 by way of the keyboard controller and the core chip 83. The CPU 84 executes processing corresponding to an instruction from the operated key in accordance with a program stored in the program ROM 86a or the D-RAM 91.

For example, it is assumed here that reproduction of a CD-ROM 66 (FIG. 7) is instructed. In this instance, the CPU 84 controls the drive controller 88 by way of the interface LSI 85 to drive the pickup drive unit 89. The pickup drive unit 89 drives the optical pickup 71 (FIG. 8) to reproduce information written on the CD-ROM 66. The drive controller 88 demodulates a signal supplied thereto from the pickup drive unit 89 and outputs a demodulated audio signal to the jack 4 or the loudspeaker 37. Consequently, the audio signal reproduced from the CD-ROM 66 can be enjoyed by way of the loudspeaker 37 or a headphone connected to the jack 4. The volume of sound then can be adjusted by manual operation of the volume button 5 (FIGS. 2 and 5). It is to be noted that, when a headphone is connected to the jack 4, supply of the audio signal to the loudspeaker 37 is stopped, but the audio signal is outputted only to the headphone.

When the audio signal is reproduced by the loudspeaker 37, the air in front of the loudspeaker 37 (outwardly of the outer lid 3) is vibrated, and also the air in the inside of the outer lid 3 in which the loudspeaker 37 is accommodated is vibrated. When the outer lid 3 is open, vibrations of the air generated outside the outer lid 3 are scattered in the open space, and consequently, they have little influence on vibrations of the air in the inside of the housing 1. Further, since the outer lid 3 is constructed separately from the housing 1, there is little possibility that vibrations of the air in the inside of the outer lid 3 are transmitted as vibrations of the air in the inside of the housing 1. Accordingly, the possibility that the servoing mechanisms for the focusing actuator, the tracking actuator and the thread motor for driving the optical pickup 71 accommodated in the housing 1 are caused to operate in error by vibrations of the air from the loudspeaker 37.

Meanwhile, a video signal reproduced from the CD-ROM 66 is outputted from the drive controller 88 and written once into the D-RAM 91 by way of the interface LSI 85. The data are processed by the core chip 83 when necessary so that they may be compatible with data of the personal computer PC/XT by IBM. The CPU 84 supplies and stores the video data into the D-RAM 97 by way of the LCD/CRT controller 94 and the interface LSI 95. Such video data developed in the D-RAM 97 are read out by way of the interface LSI 95 by the controller 94 and outputted to and displayed on the LCD 100 (display section 31) by way of the driver 99. In this instance, the controller 94 controls, when a change of the gray scale is instructed, the interface LSI 95 so that the gray scale of picture element data is changed in accordance with the table stored in the ROM 96 and the thus changed gray scale is outputted. The gray scale control is realized by controlling the number of transmissions or interceptions of light for each picture element of the LCD 100 per unit time.

When a CRT (cathode ray tube) or a like apparatus is connected to the video output terminal 9, the controller 94 controls the driver 99 by way of the interface LSI 95 to extinguish the backlight for the LCD 100 to stop display of an image of the same. Then, video data read out from the D-RAM 96 are converted into a video signal of the NTSC system by the converter 98 and outputted to the video output terminal 9. As a result, an image based on the video data read out from the CD-ROM 66 can be monitored on the CRT of the NTSC system. It is to be noted that, in this instance, outputting of an audio signal from the jack 4 or the loudspeaker 37 continues as it is.

Audio data, video data or text data are converted into RS232C data by the UART 92 and outputted by way of the driver receiver 93 from the plug 7 when necessary.

Figure 10:
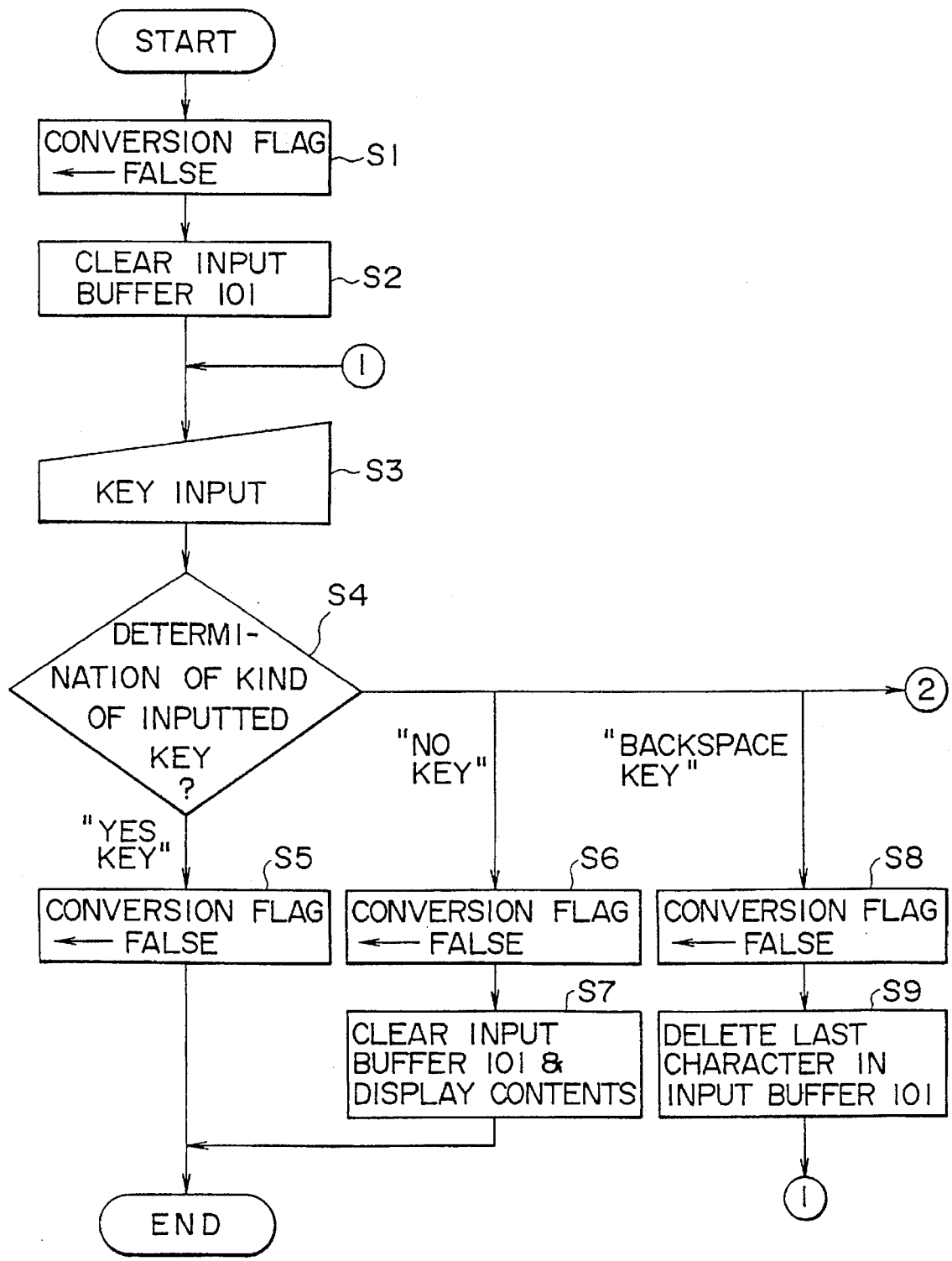
FIGS. 10 and 11 are flow charts illustrating operation of the CD-ROM reproducing apparatus of FIG. 1; is a diagrammatic view illustrating different models and matching programs PIEX.
Figure 11:
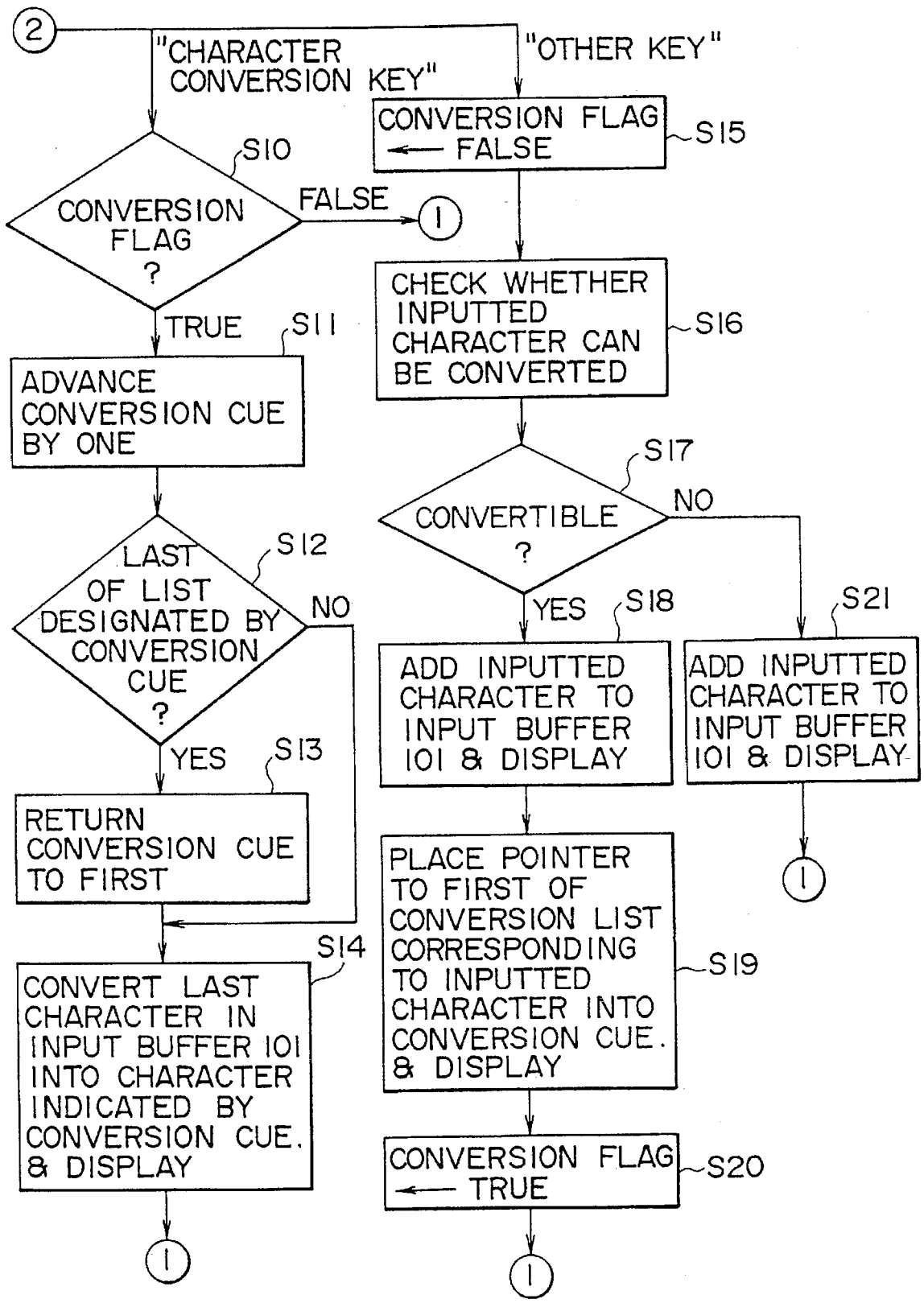

Subsequently, operation of the information processing system when a character is inputted will be described with reference to FIGS. 10 and 11. It is to be noted that the operation described below is realized by processing by the CPU 84 in accordance with a program stored in the program ROM 86a.

First at step S1, FALSE is placed into a conversion flag. The conversion flag is set either to FALSE which represents that the alphabetical character does not have a corresponding character of another language or to TRUE which represents that the alphabetical character has a corresponding character of another language. Then at step S2, the input buffer 101 for characters built in the interface LSI 95 is cleared. The input buffer 101 is provided to store data corresponding to characters to be displayed on the LCD 100.

Then at step S3, inputting of a key is waited, and then when some key is inputted, the control sequence advances to step S4, at which the kind of the thus inputted key is determined.

If it is determined at step S4 that the inputted key is the YES key 52, the control sequence advances to step S5, at which FALSE is placed into the conversion flag, whereafter the processing comes to an end.

Otherwise, if it is determined at step S4 that the inputted key is the NO key 53, the control sequence advances to step S6, at which FALSE is similarly placed into the conversion flag. Thereafter, the control sequence advances to step S7, at which the input buffer 101 of the interface LSI 95 is cleared, and as a result, also characters to be displayed on the LCD 100 are cleared.

In this manner, the YES key 52 is manually operated, when an inputted character string is to be settled, at the last end of the character string whereas the NO key 53 is manually operated when all of such inputted character string is to be erased or cancelled.

On the other hand, if it is determined at step S4 that the inputted key is the backspace key 27, the control sequence advances to step S8, at which FALSE is placed into the conversion flag. Then at step S9, the last character in the input buffer 101 is deleted and also the display of the corresponding character on the LCD 100 is deleted. The control sequence returns from step S9 to step S3 to wait for next inputting of a key.

Or else, if it is determined at step S4 that the character conversion key 25 has been manually operated, then the control sequence now advances to step S10, at which it is determined whether the conversion flag is TRUE or FALSE. When the conversion flag is FALSE, since another language includes no character corresponding to the alphabetical character just inputted, the manual operation of the character conversion key 25 is determined invalid. Consequently, the control sequence advances, without executing any processing, to step S3 to wait for next inputting of a key.

On the contrary when it is determined at step S10 that the conversion flag is TRUE, the control sequence now advances to step S11, at which the conversion cue is advanced by one. In particular, for example, as shown in FIG. 27(a), the alphabetical character e and corresponding characters of the other languages are stored in the input buffer 101, and the conversion cue is present at the position corresponding to the character displayed at present. Since the character conversion key 25 has been manually operated at step S3 and consequently the processing at step S11 is initiated, the conversion cue is advanced by one in response to the manual operation of the character conversion key 25 so as to cause a next character to be displayed. In the example shown in FIG. 27(a), the conversion cue is shifted rightwardly by one character.

The control sequence advances from step S11 to step S12, at which it is determined that the conversion cue indicates the last character of the list. The last character of the list signifies the position of, for example, a rightmost character in FIG. 27(a). When the conversion cue indicates the last character, since no following character exists, the control sequence returns to step S13, at which the conversion cue is returned to the first character of the list.

For example, in FIG. 27(a), although the conversion cue is shifted rightwardly by one character each time the character conversion key 25 is manually operated, if the character conversion key 25 is manually operated after the conversion cue reaches the position of the rightmost character of the list, then the conversion cue is shifted back to the position of the leftmost character of the list. Consequently, the characters are arranged substantially in a loop, and accordingly, they can be selected in a circulating manner by successive manual operation of the character conversion key 25. If it is determined at step S12 that the conversion cue does not indicate the last character of the list, the processing at step S13 is skipped.

At step S14 to which the control sequence advances from step S12 or S13, the last character in the input buffer 101 is changed to the character indicated by the conversion cue. Then, since characters corresponding to the data inputted to the input buffer 101 are displayed on the LCD 100, the character indicated by the conversion cue as a result of the replacement of the data is displayed on the LCD 100. From step S14, the control sequence returns to step S3 to wait for next inputting of a key.

When it is determined at step S4 that the inputted key is any other key such as, for example, an alphabetical character key 23, the control sequence advances to step S15, at which the conversion flag is set to FALSE. Then at step S16, it is checked whether or not the thus inputted key indicates a character which can be converted into another character. For example, when the alphabetical character a is inputted, it is checked that the alphabetical character a has a corresponding character in another language.

Thereafter, the control sequence advances to step S17, at which a result of the checking at step S16 is determined. In particular, it is determined whether or not there is present in another language a character which corresponds to the inputted character. When it is determined that no such corresponding character is present, the control sequence advances to step S21, at which the character inputted by manual operation of the character key 23 is additionally stored into the input buffer 101 and displayed on the LCD 100. Thereafter, the control sequence returns to step S3 to wait for next inputting of a key.

If presence of a corresponding character in another language is determined at step S17, the control sequence advances to step S18, at which the thus inputted alphabetical character is added to the input buffer 101 and displayed on the LCD 100, and then to step S19, at which a pointer to the first character of a list of the language corresponding to the inputted alphabetical character is inputted to the conversion cue. Then, the pointer is displayed. Consequently, the conversion cue corresponds to the first character of the list. Subsequently, the control sequence advances to step S20, at which TRUE is placed into the conversion flag, whereafter the control sequence returns to step S3 to wait for next inputting of a key.

After TRUE is placed into the conversion flag at step S20, the control sequence advances from step S10 to step S11 as described above so that, each time the character conversion key 25 is depressed, the character corresponding to the conversion cue is successively replaced by another character of the language so as to be displayed.

The processing described above will be described below by way of examples of display of the LCD 100 with reference to FIGS. 12 to 20.

Figure 12:
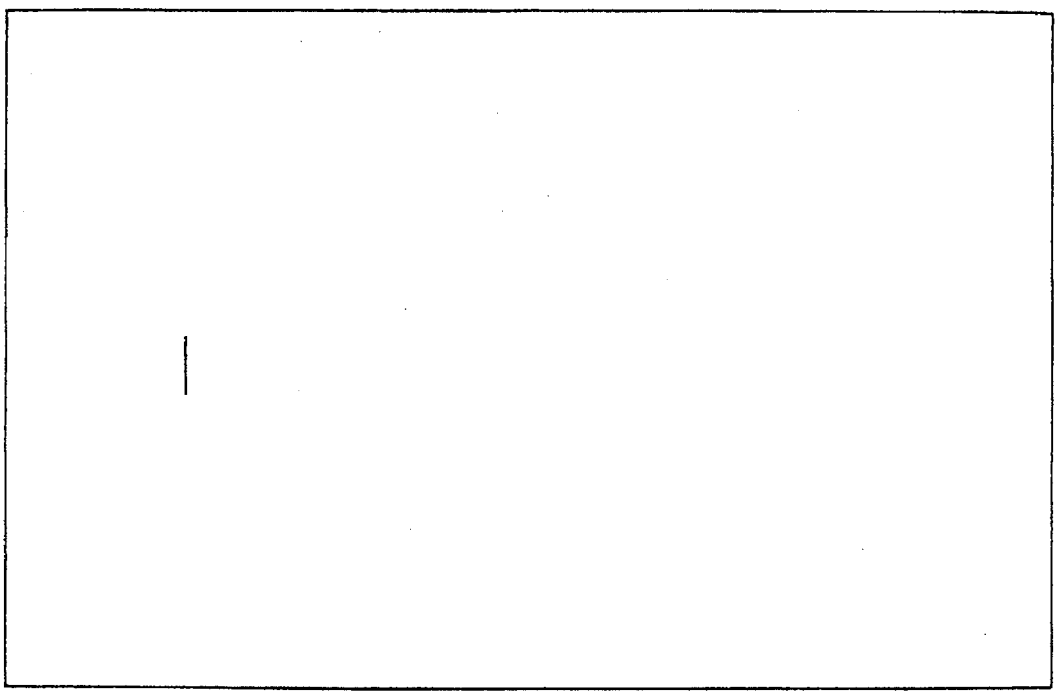
FIGS. 12 to 22 are diagrammatic views showing different examples of display of a LCD shown in FIG. 9.
Figure 13:
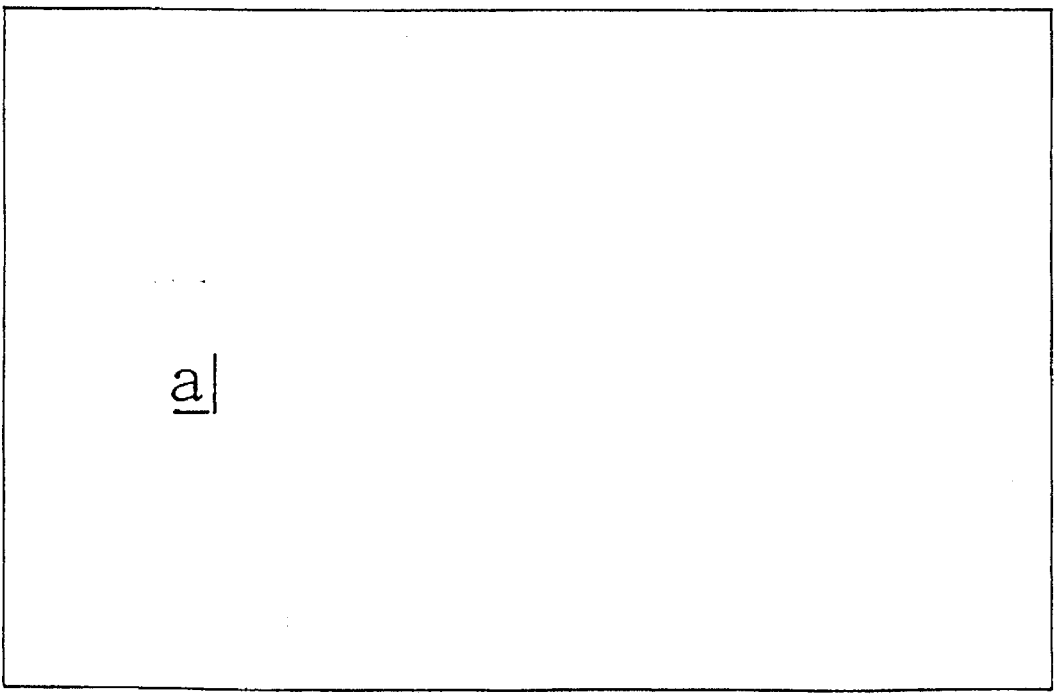
Figure 14:
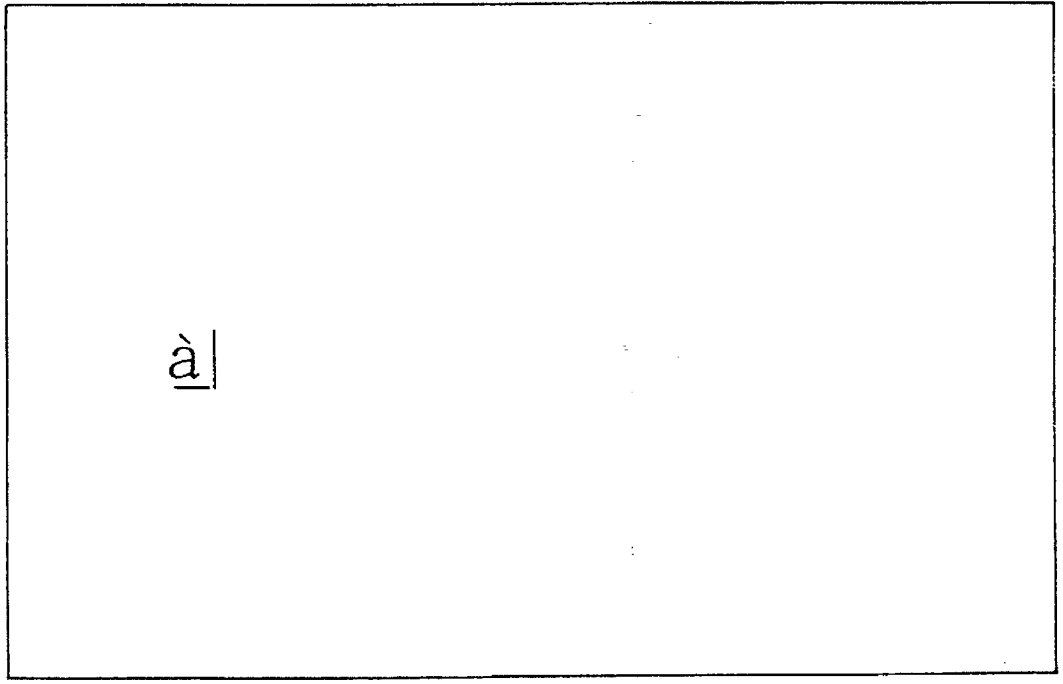
Figure 15:
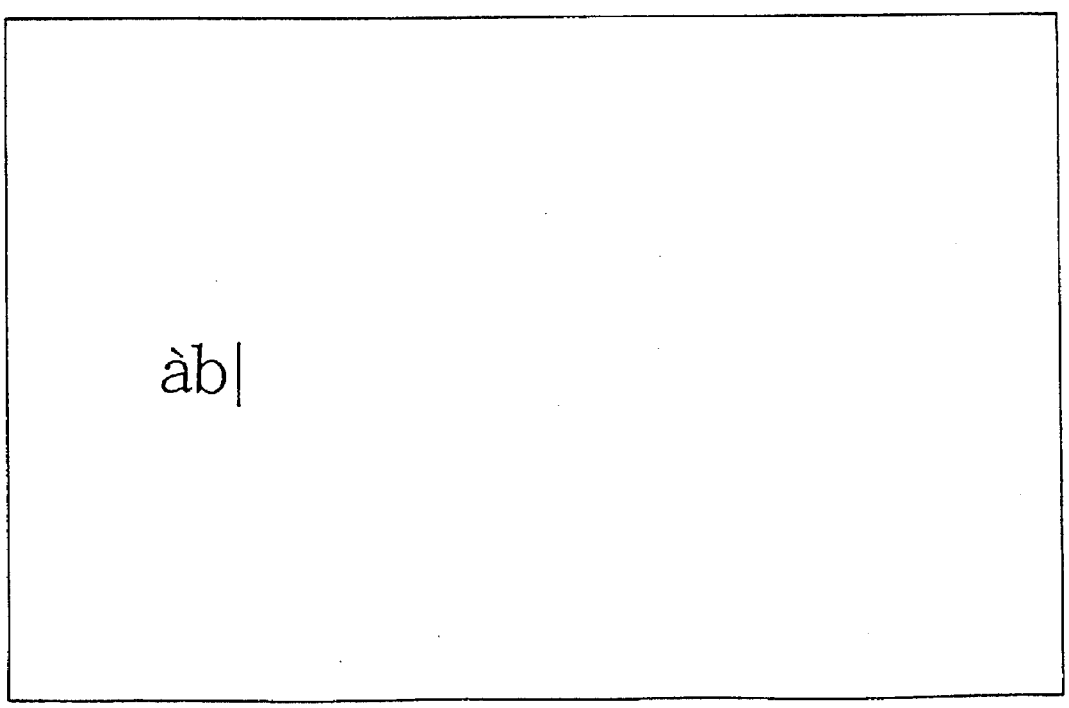
Figure 16:
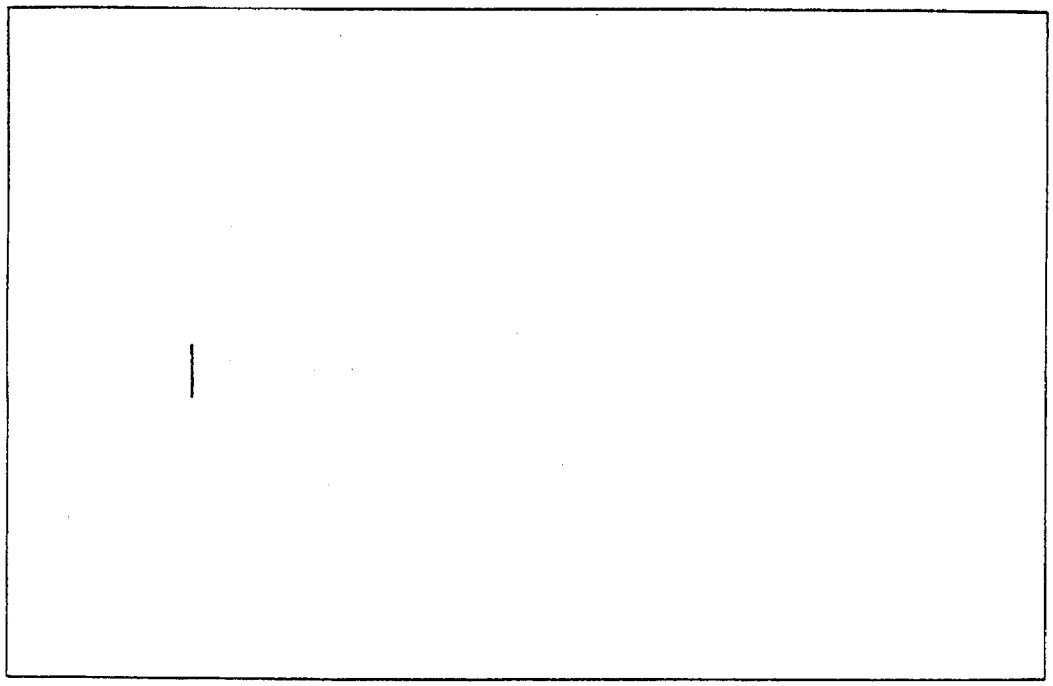

FIG. 12 shows the display screen of the LCD 100 when nothing has been inputted. In FIG. 12, only a cursor is indicated on the display screen. If, in this condition, for example, a character key 23 is manually operated to input the alphabetical character a, then the alphabetical character a is displayed on the display screen of the LCD 100 as shown in FIG. 13. If the character conversion key 25 is manually operated after the alphabetical character a has been inputted in this manner, then the character displayed on the display screen is converted to another character which is the alphabetical character with a grave accent added thereabove as seen from FIG. 14. Then, if another character key 23 is manually operated to input the alphabetical character b, then the alphabetical character b is displayed next to the character a with a grave accent on the display screen of the LCD 100 as seen from FIG. 15.

Figure 17:
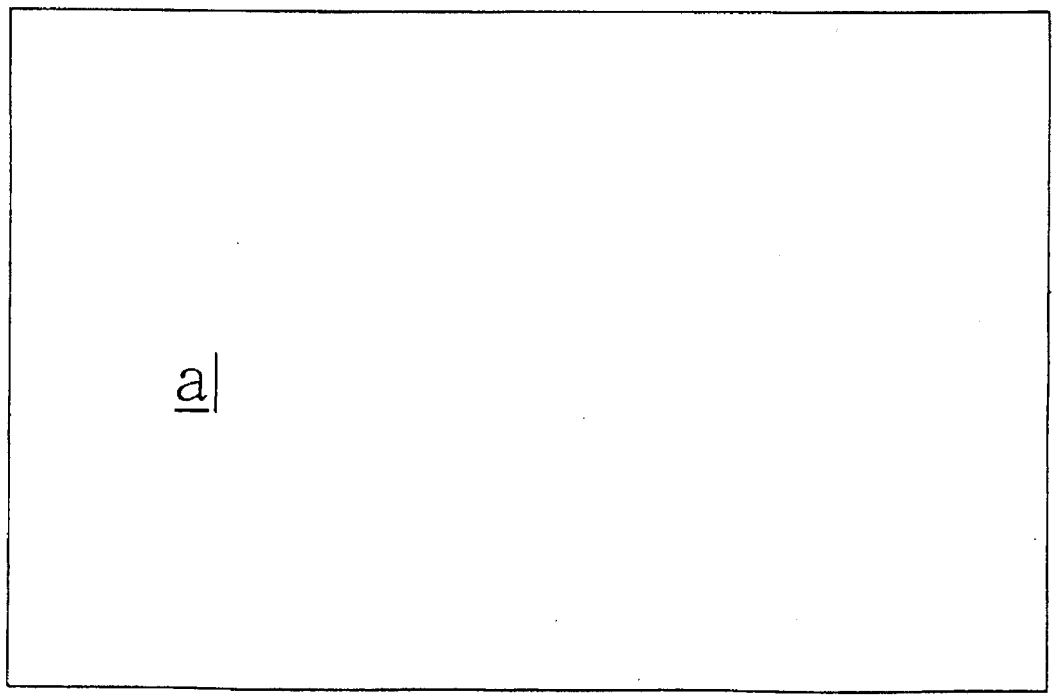
Figure 18:
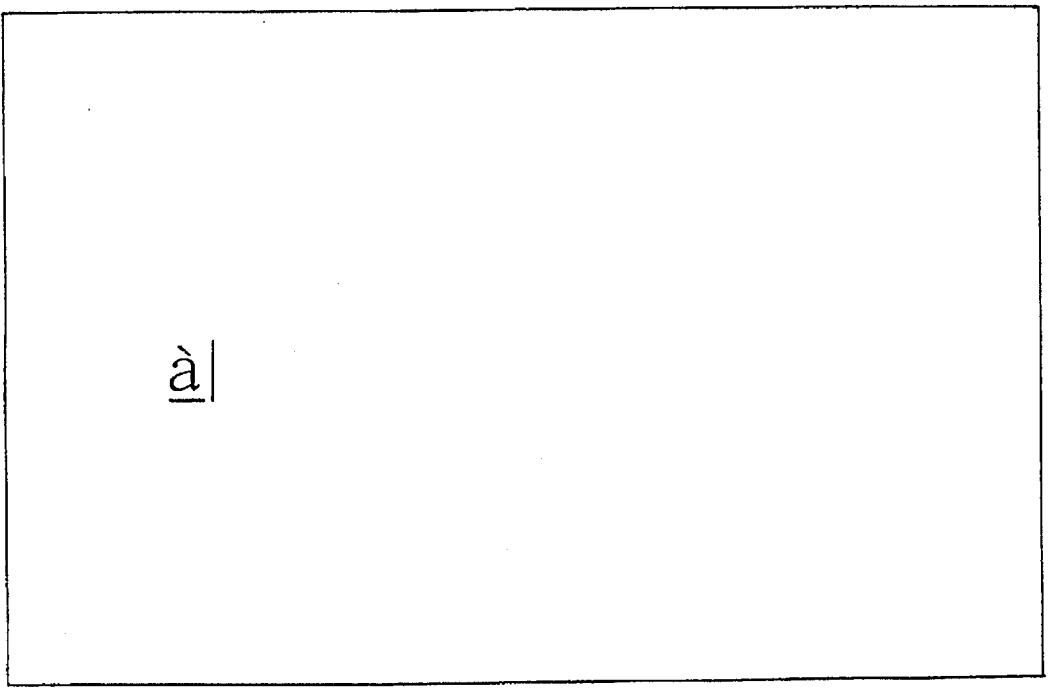
Figure 19:
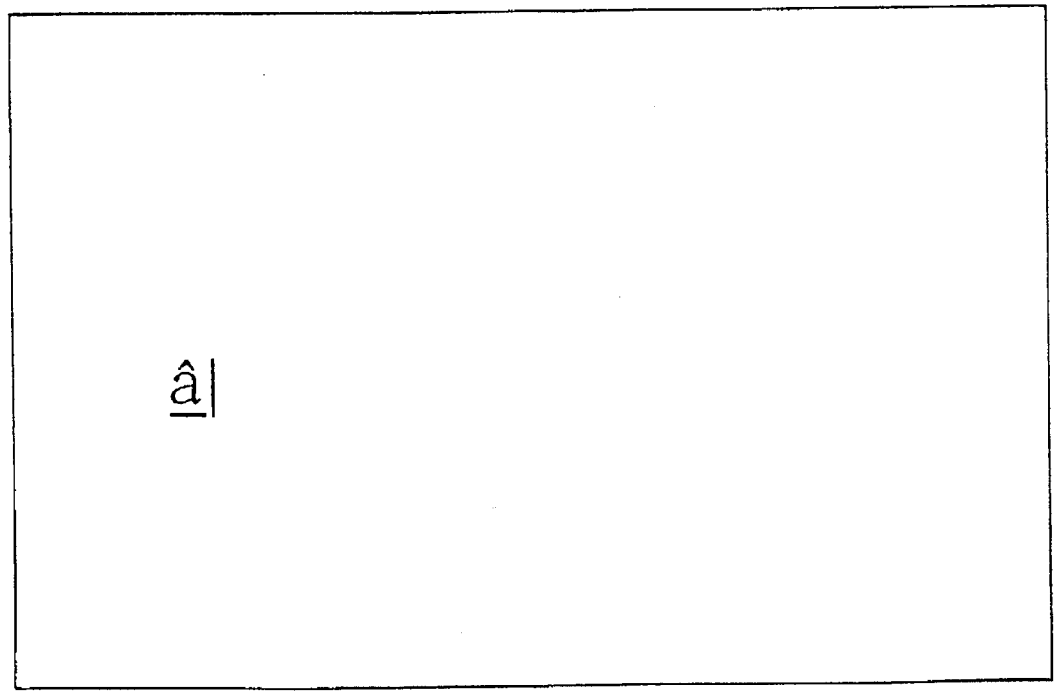
Figure 20:
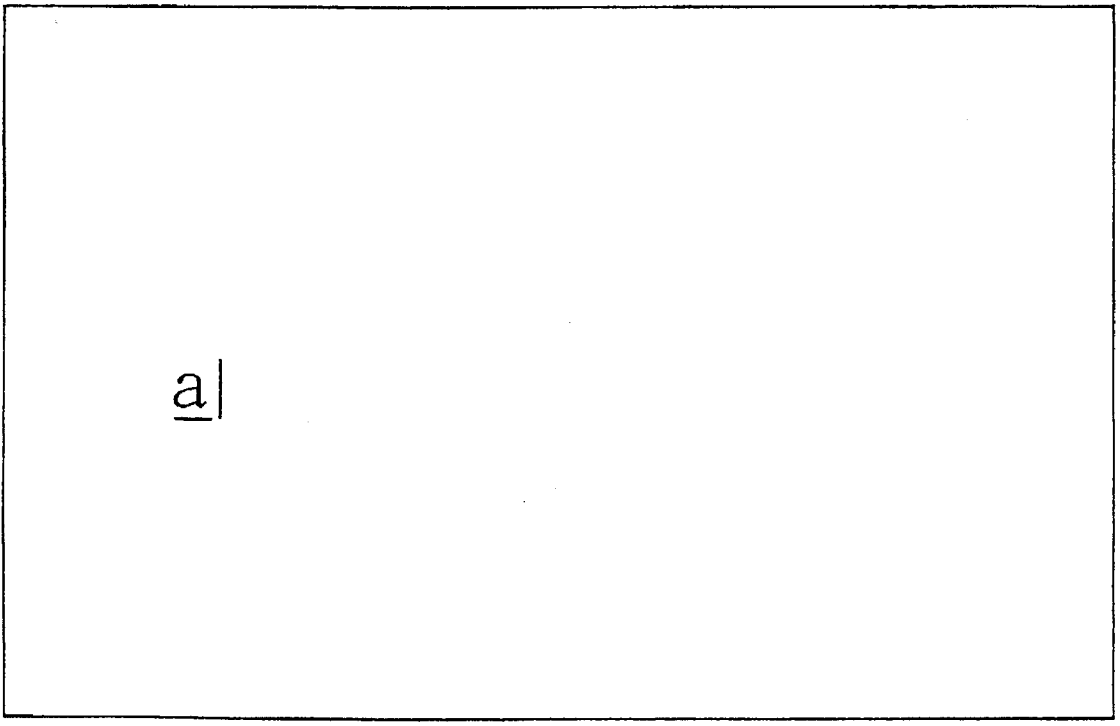

FIGS. 16 to 20 show examples of the display of the LCD 100 when a plurality of characters corresponding to an alphabetical character are present in another language. In particular, if a character key 23 is manually operated to input the alphabetical character a in a condition wherein nothing is inputted and then displayed on the display screen of the LCD 100 as seen from FIG. 16, then the alphabetical character a is displayed on the display screen of the LCD 100 as shown in FIG. 17. Then, if the character conversion key 25 is manually operated once, then the alphabetical character a is converted to the character a with a grave accent as shown in FIG. 18. If, in this condition, the character conversion key 25 is manually operated once again, the character displayed is converted to the character a with a circumflex accent as shown in FIG. 19. Further, if the character conversion key 25 is manually operated once again, then the character displayed is converted to the character a with no accent added thereto as seen from FIG. 20.

Figure 21:
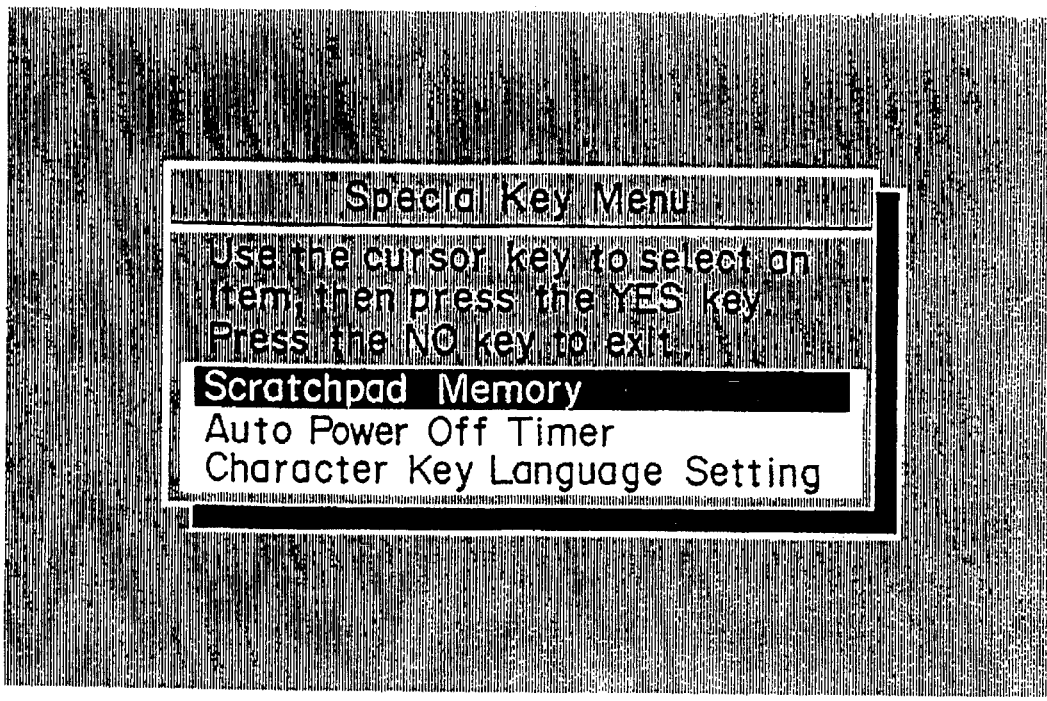
Figure 22:
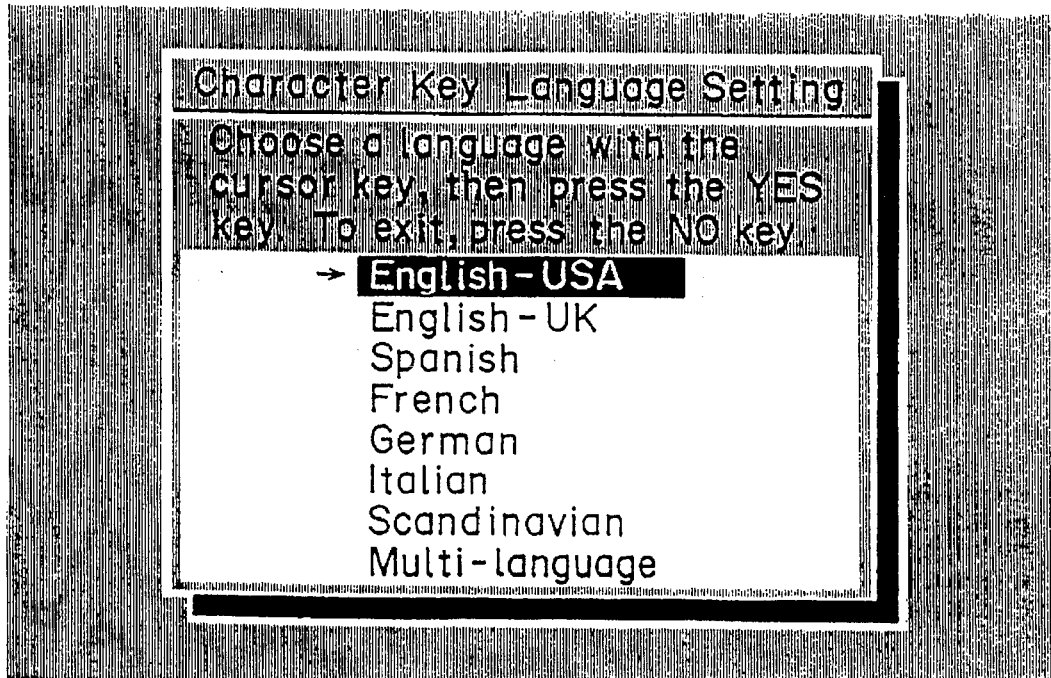

The character table ROM 86b in the present embodiment stores conversion tables for eight different languages. In order to select one of the tables, the special key 28 will be manually operated. If the special key 28 is manually operated once, then such a special key menu as shown in FIG. 21 is displayed on the display screen of the LCD 100. If, in this condition, the cursor is moved to the position of "Scratchpad Memory" and then the YES key 52 is manually operated, then such a menu as shown in FIG. 22 is displayed. As seen from FIG. 22, the menu includes a list of languages prepared in the character table ROM 86b. In the present embodiment, a total of eight languages including the English-USA, English-UK, Spanish, French, German, Italian and Scandinavian languages and a multi-language are prepared.

FIGS. 23 to 26 illustrate relationships of the English-USA with the other available languages with regard to the characters indicated on the character keys 23. For example, if the cursor is moved, when the display of the display screen of the LCD 100 is such as shown in FIG. 22, to select the French language, then if an alphabetical character key 23 is manually operated to input the character e and then the character conversion key 25 is manually operated, then each time the character conversion key 25 is operated, the character displayed is successively converted to the character e with an acute accent, e with a grave accent, e with a circumflex accent, and e with an umlaut (accent trema) in this order.

The lists shown in FIGS. 23 to 25 indicate characters used in the English-UK, French, German, Spanish, Italian and Scandinavian languages corresponding to the alphabetical characters (English-USA). Thus, such characters uniquely used in those languages are stored corresponding to those alphabetical characters which are nearest to the characters.

It is otherwise possible to set so that, for example, e with an acute accent, e with a grave accent, e with a circumflex accent and e with an umlaut, which are used in the French language, correspond to some other character than the alphabetical character e, for example, to the alphabetical character x. With such setting, however, when the operator tries to input one of the characters, the operator must remember to which alphabetical character the one character corresponds. Consequently, the operability is low. On the other hand, where those characters correspond to an alphabetical character which is the basic character to them, the operator can determine a corresponding character key by intuition. Consequently, the operability is high.

As seen from FIG. 26, the multi-language is a language system in which the languages illustrated in FIGS. 23 to 25 are collected and put in order. Accordingly, if the multi-language is selected, then any character which is used in the available languages can be selected.

By the way, if it is tried to always store e, e with an acute accent, e with a grave accent, e with a circumflex and e with an umlaut in this order as shown in FIG. 27(a) in the input buffer 101, then if it is tried to select e with an umlaut, then the character conversion key 25 must be manually operated four times without fail. Thus, for example, if the information processing apparatus is constructed such that, when the character conversion key 25 is manually operated to select a particular character, a code of the selected character is stored into the EEPROM 87 or the like, then the character can be positioned next to the alphabetical character e. For example, when e with an umlaut is selected, e, e with an umlaut, e with an acute accent, e with a grave accent and e with a circumflex are thereafter arranged in this order in the input buffer as seen from FIG. 27(b). With the modified stored contents of the input buffer, when the character conversion key 25 is manually operated for the next time, e with an umlaut will be displayed first. In this manner, the information processing apparatus can learn the circumstances of use of the operator and re-arrange the characters in the order of frequency of use.

While, in the embodiment described above, the special key 28 is manually operated to select a desired one of the conversion tables, it is otherwise possible to select a desired table, for example, by performing such inputting as illustrated in FIG. 28 in each applicable program to call the service of PIEX. As seen from FIG. 28, "05h" and "00h", which indicate an instruction to select a language, will be inputted to registers AH and AL, respectively. Then, the orderly number of the language to be selected is inputted to a further register BX. The number here ranges from 0 to 7. In the present embodiment, 0 corresponds to the English-USA; 1 to the English-UK; 2 to the Spanish; 3 to the French; 4 to the German; 5 to the Italian; 6 to the Scandinavian; and 7 to the multi-language. An output register AX is set to 1 when any other number than 0 to 7 is designated, but to 0 when one of the numbers from 0 to 7 is designated.

Having now fully described the invention, it will be apparent to one of ordinary skill in the art that many changes and modifications can be made thereto without departing from the spirit and scope of the invention as set forth herein.

What is claimed is:

1. An information processing apparatus, comprising:
   a plurality of manually operable character keys for inputting a set of characters of a first language;
   a table for storing characters of a plurality of second languages corresponding to the individual characters of the first language;
   a manually operable conversion key for converting a last one of said characters of said first language inputted by manual operation of one of the character keys into a corresponding character defined in one of said second languages corresponding to the last one of said characters of said first language;
   display means for displaying characters; and
   controlling means for causing said display means to display a character of the first language in response to manual operation of one of the character keys and referring, each time said conversion key is manually operated subsequently, to said table to progressively replace the character displayed on said display means with progressive ones of said corresponding characters of the second languages;
   wherein the controlling means is programmable to alternately (1) cause the characters of all of said plurality of second languages to be progressively displayed responsive to said conversion key and (2) cause the characters of only one of said plurality of second languages to be progressively displayed responsive to said conversion key.

2. An information processing apparatus according to claim 1 wherein the characters of the first language are English alphabetical characters and the second language is a Latin language other than the English language, and further wherein characters used in the Latin language are stored in said table corresponding to similar alphabetical characters in the English language.

3. An information processing apparatus according to claim 2 wherein the table stores a plurality of associated characters in the Latin language corresponding to a similar English alphabetical character.

4. An information processing apparatus according to claim 3 wherein, each time said conversion key is manually operated after said controlling means causes said display means to display a character of the first language in response to manual operation of one of the character keys, said controlling means successively converts the character displayed on said display means into a successive one of said plurality of associated characters of the second languages corresponding to said displayed character of said first language.

5. An information processing apparatus according to claim 3 wherein, each time said conversion key is manually operated, said controlling means successively converts the character displayed on said display means into a successive one of the associated characters of the second languages corresponding to said displayed character of said first language, and when said conversion key is manually operated after the displayed character is converted into a last one of the associated characters, a similar sequence of conversion operations is repeated.

6. An information processing apparatus, comprising:
   a plurality of manually operable character keys for inputting a characters of a first language, each character key associated with a character of said first language;
   a table for storing characters of a second language corresponding to individual characters of the first language;
   a manually operable conversion key for successively converting a last one of said characters inputted by manual operation of one of the character keys into a character defined in said second language corresponding to the last one of said characters of said first language;
   display means for displaying characters; and
   controlling means for causing said display means to display a character of the first language in response to manual operation of one of the character keys and, each time said conversion key is manually operated subsequently to operation of one of said character keys without intervening operation of a character key, referring to said table to successively convert the character displayed on said display means into a successive one of said plurality of corresponding characters of said second language,
   wherein said controlling means further comprises means for determining a last one of said successive characters of the second language corresponding to a particular displayed character of said first language to be displayed before another character of said first language is inputted and means for altering an order of said successive associated characters of the second language so that the next time said conversion key is operated after said particular character key, said last character of the second language is displayed first.

7. An information processing apparatus according to claim 6 wherein the table stores a plurality of associated characters of the second language corresponding to a similar character of the first language.

8. An information processing apparatus according to claim 7 wherein characters of languages of a plurality of second languages corresponding to a character of the first language are stored in said table as a multilanguage corresponding to said character of said first language.

9. An information processing apparatus according to claim 6 wherein the characters of the first language are English alphabetical characters and the second language is a Latin language other than the English language, and further wherein characters used in the Latin language are stored in said table corresponding to similar alphabetical characters in the English language.

10. An information processing apparatus according to claim 9 wherein the table stores a plurality of associated characters in the Latin language corresponding to a similar English alphabetical character.

11. An information processing apparatus according to claim 10 wherein, each time said conversion key is manually operated after said controlling means causes said display means to display a character of the first language in response to manual operation of one of the character keys, said controlling means successively converts the character displayed on said display means into a successive one of said plurality of associated characters of the second language corresponding to said displayed character of said first language.

12. An information processing apparatus according to claim 10 wherein, each time said conversion key is manually operated, said controlling means successively converts the character displayed on said display means into a successive one of the associated characters of the second language corresponding to said displayed character of said first language, and when said conversion key is manually operated after the displayed character is converted into a last one of the associated characters, a similar sequence of conversion operations is repeated.

* * * * *